United States Patent
Sherman (10) Patent No.: US 8,655,340 B2
(45) Date of Patent: Feb. 18, 2014

(54) METHOD, APPARATUS, AND COMPUTER PROGRAM PRODUCT FOR WIRELESS CUSTOMER SERVICES

(75) Inventor: Stephen K. Sherman, Alpharetta, GA (US)

(73) Assignee: AT&T Intellectual Property I, L.P., Atlanta, GA (US)

(\*) Notice: Subject to any disclaimer, the term of this patent is extended or adjusted under 35 U.S.C. 154(b) by 402 days.

(21) Appl. No.: 12/251,091

(22) Filed: Oct. 14, 2008

(65) Prior Publication Data

US 2010/0093319 A1 Apr. 15, 2010

(51) Int. Cl.
*H04M 3/00* (2006.01)

(52) U.S. Cl.
USPC ......... 455/419; 455/414.1; 455/418; 455/423

(58) Field of Classification Search
USPC ........ 455/418, 419, 420, 412.1, 412.2, 414.1, 455/423, 425, 432.3
See application file for complete search history.

(56) References Cited

U.S. PATENT DOCUMENTS

| | | | |
|---|---|---|---|
| 7,334,034 B2 | 2/2008 | Tang et al. | |
| 7,353,016 B2 * | 4/2008 | Roundtree et al. | 455/414.1 |
| 7,389,254 B2 | 6/2008 | McCleery | |
| 7,809,366 B2 * | 10/2010 | Rao et al. | 455/419 |
| 2004/0166839 A1 * | 8/2004 | Okkonen et al. | 455/419 |
| 2004/0242216 A1 * | 12/2004 | Boutsikakis | 455/418 |
| 2005/0014531 A1 * | 1/2005 | Findikli | 455/557 |
| 2005/0124322 A1 * | 6/2005 | Hennecke | 455/412.1 |
| 2006/0143578 A1 * | 6/2006 | Maktedar | 715/847 |
| 2006/0148520 A1 * | 7/2006 | Baker et al. | 455/556.2 |
| 2006/0217111 A1 * | 9/2006 | Marolia et al. | 455/418 |
| 2006/0281407 A1 * | 12/2006 | Deeds | 455/41.2 |
| 2008/0016398 A1 * | 1/2008 | Jesudoss et al. | 714/37 |
| 2008/0180654 A1 * | 7/2008 | Bathiche et al. | 356/51 |

\* cited by examiner

*Primary Examiner* — Suhail Khan
(74) *Attorney, Agent, or Firm* — Hartman & Citrin LLC (57) ABSTRACT

A method, apparatus, and computer program product for wireless customer service are provided. A request for assistance for a mobile device is received. Information regarding a type of the mobile device is received. A script that corresponds to the requested assistance for the mobile device is determined. The script that corresponds to the requested assistance is transmitted to the mobile device. In response to the mobile device receiving the script, the script is initiated on the mobile device. The script causes the mobile device to assist a user with a feature of the mobile device corresponding to the request for assistance.

17 Claims, 5 Drawing Sheets

METHOD, APPARATUS, AND COMPUTER PROGRAM PRODUCT FOR WIRELESS CUSTOMER SERVICES

BACKGROUND

Exemplary embodiments relate generally to communications, and more particularly, to providing assistance for wireless customer services.

Today, many people utilize mobile devices, such as cellular telephones, smartphones, handheld devices, personal digital assistants (PDA), handsets, etc. These mobile devices come with a variety of features and services.

However, many users need assistance to take advantage of the options offered by the mobile device. When a user calls customer service, most every mobile device has a unique interface so it is difficult for the customer service representative to navigate the user to a specific setting or menu on the mobile device.

Currently, wireless customer service representatives try to talk a user through multiple menu screens of the mobile device using a guide on the workstation of the customer service representative. Wired customer service representatives sometimes use remote control access where they help users navigate or setup features by actually being given access to take temporary control of the user desktop. This is possible by using the more standard operating systems in the PC environment. In the wireless world, however, this does not work as well since most of the wireless device operating systems and user interfaces are different. This could be done on a mobile but it requires more bandwidth and an application on the mobile device to support remote control access. The remote control feature also creates an unwanted security risk too.

It would be beneficial to have mechanisms to assist wireless customer service representatives and to assist mobile device users with various options related to the mobile device.

BRIEF SUMMARY

Exemplary embodiments include a method for wireless customer service. A request for assistance from a mobile user or mobile device is received. Information regarding a type of the mobile device is acquired from the mobile carrier system or received from the mobile user. A script that corresponds to the requested assistance for the mobile device is determined. The script that corresponds to the requested assistance is transmitted to the mobile device. In response to the mobile device receiving the script, the script is initiated/executed on the mobile device. The script causes the mobile device to assist a user with a feature of the mobile device corresponding to the request for assistance.

Additional exemplary embodiments include a wireless customer service server for providing wireless customer services. The server includes memory for storing a program for providing wireless customer services and a processor, functionally coupled to the memory. The processor is responsive to computer-executable instructions contained in the program and operative to receive a request for assistance for a mobile device, receive information regarding a type of the mobile device, determine a script that corresponds to the requested assistance for the mobile device, and transmit the script that corresponds to the requested assistance to the mobile device. In response to the mobile device receiving the script, the script is initiated/executed on the mobile device. The script causes the mobile device to assist a user with a feature of the mobile device corresponding to the request for assistance.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

Exemplary embodiments provide a mechanism with broader appeal, less overhead, and better security, and it will be appreciated that exemplary embodiments are different from retrieving a solution from the World Wide Web for a personal computer. Exemplary embodiments provide mechanisms for resolving issues in the wireless world as discussed herein.

Exemplary embodiments provide the ability for a customer service representative to push, e.g., a short message service (SMS) to a customer which will contain scripting specific to that mobile device to direct the mobile device automatically to assist with a feature (e.g., to direct the mobile device to the correct screen). For example, if a caller is having trouble turning on Bluetooth in his/her phone, the customer service representative could transmit an SMS specific to the phone in question designed to switch on Bluetooth for the user. In one exemplary embodiment, the user may open the SMS message and be prompted with a question about running a script, such as "Do you want to allow the attached script titled 'turn on Bluetooth' to run?" In response to the user allowing the script to run, the phone would run the script to turn on Bluetooth. Also, in exemplary embodiments, the SMS message may be embedded with instructions to assist the user. The instructions can direct the user how to turn on Bluetooth. Further, in exemplary embodiments, the SMS message may automatically turn on Bluetooth, e.g., after the SMS message has been opened.

Unlike downloads to a personal computer, the added benefit of sending these scripts is that it would allow the user to save (e.g., in the inbox, etc.) and rerun these scripts in the future should the user again forget how to turn on the Bluetooth feature. As such, the user may return the inbox and rerun the scripts. Additionally, the script may include an option to allow the user to assign the script to a softkey or some other shortcut. In accordance with exemplary embodiments, the ability to send 'macro' or 'exe' to a mobile device is not limited to SMS (described in the example), exemplary embodiments may be accomplished by any kind of transport mechanisms including electronic mail (email), multimedia messaging service (MMS), instant messaging (IM), and/or peer to peer connections.

Exemplary embodiments afford the customer service representative or technician with the ability to provide a mechanized method of adjusting a user's mobile device without forcing the user to do anything beyond receiving a message and executing some code (script). This enables the customer service representative with the tools to quickly manage callers' requests and potentially eliminate repeat calls by allowing the user to reuse the scripts.

In accordance with exemplary embodiments, the scripts may be generated automatically by the customer service system through an interface which would receive the phone type, the software version, and the action requested. For example, the information received by the interface may be the following: RIM Blackberry 8700, v410194 (platform 2.0.0.90), Activate Bluetooth. There are various ways to receive this information. This information might be manually input by the customer service representative and/or input by the user of the mobile device. Also, software information may be pulled from a customer database or be pulled from the mobile device itself, which allows the customer service representative to only select the feature from a graphical user interface (GUI) generated by the customer service system based on the capabilities of the mobile device and current version of software.

Figure 1:
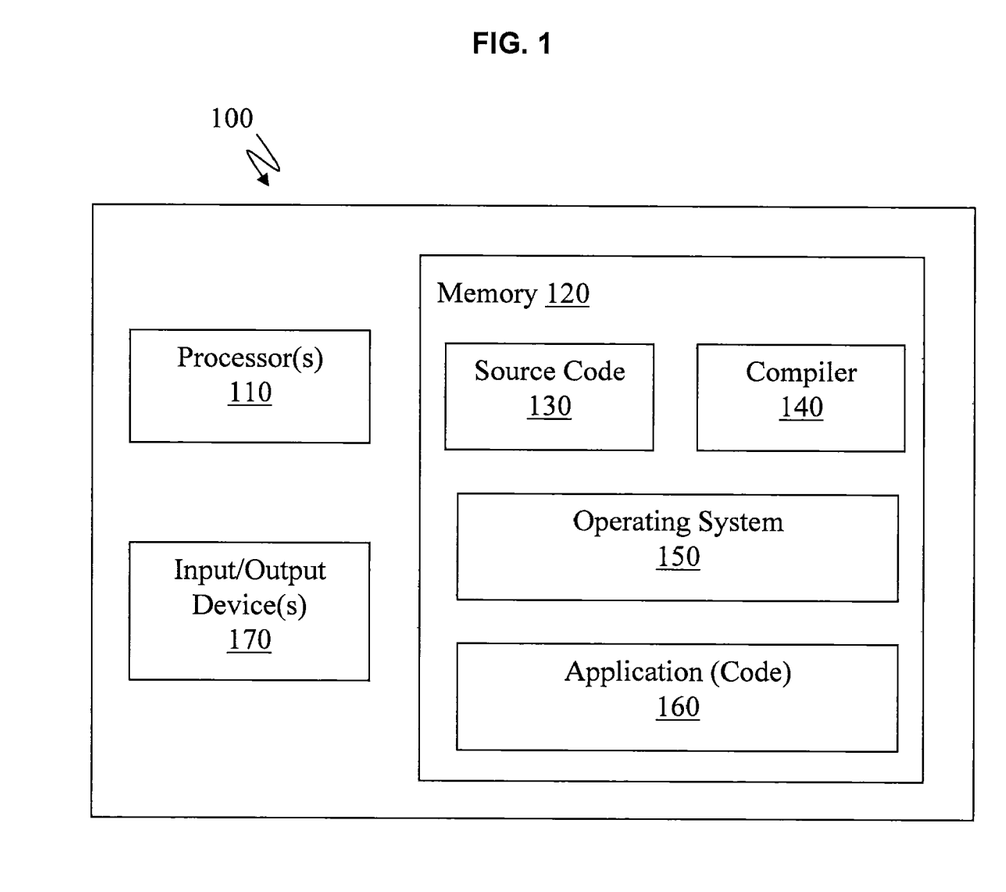
FIG. 1 illustrates an example of a computer having elements that may be used in implementing exemplary embodiments.

Now turning to FIG. 1, FIG. 1 illustrates an example of a computer 100 having elements that may be used in implementing exemplary embodiments. The computer 100 includes, but is not limited to, PCs, workstations, laptops, PDAs, palm devices, servers, mobile devices, and the like. The computer 100 may include a processor 110, memory 120, and one or more input and/or output (I/O) 170 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

According to exemplary embodiments, the processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor.

The memory 120 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the memory 120 may include one or more separate programs, each of which comprises an ordered listing of executable instructions for implementing logical functions. In the example illustrated in FIG. 1, the software in the memory 120 includes a suitable operating system (O/S) 150, compiler 140, source code 130, and applications (code) 160 of the exemplary embodiments.

The operating system 150 controls the execution of other computer programs, and provides scheduling, input-output control, file and data management, memory management, and communication control and related services. It is contemplated by the inventors that the application 160 for implementing exemplary embodiments is applicable on all other commercially available operating systems.

The application 160 may be a source program, executable program (object code), script, or any other entity comprising a set of instructions to be performed. When a source program is to be executed, then the program is usually translated via a compiler (such as the compiler 140), assembler, interpreter, or the like, which may or may not be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O 170 devices may include input devices such as, for example but not limited to, a mouse, keyboard, scanner, microphone, etc. Furthermore, the I/O 170 devices may also include output devices, for example but not limited to, a printer, display, etc. Also, the I/O 170 devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

When the computer 100 is in operation, the processor 110 is configured to execute software stored within the memory 120, to communicate data to and from the memory 120, and to generally control operations of the computer 100 pursuant to the software. The application 160 and the O/S 150 are read, in whole or in part, by the processor 110, perhaps buffered within the processor 110, and then executed.

When the application 160 is implemented in software, it should be noted that the application 160 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 160 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
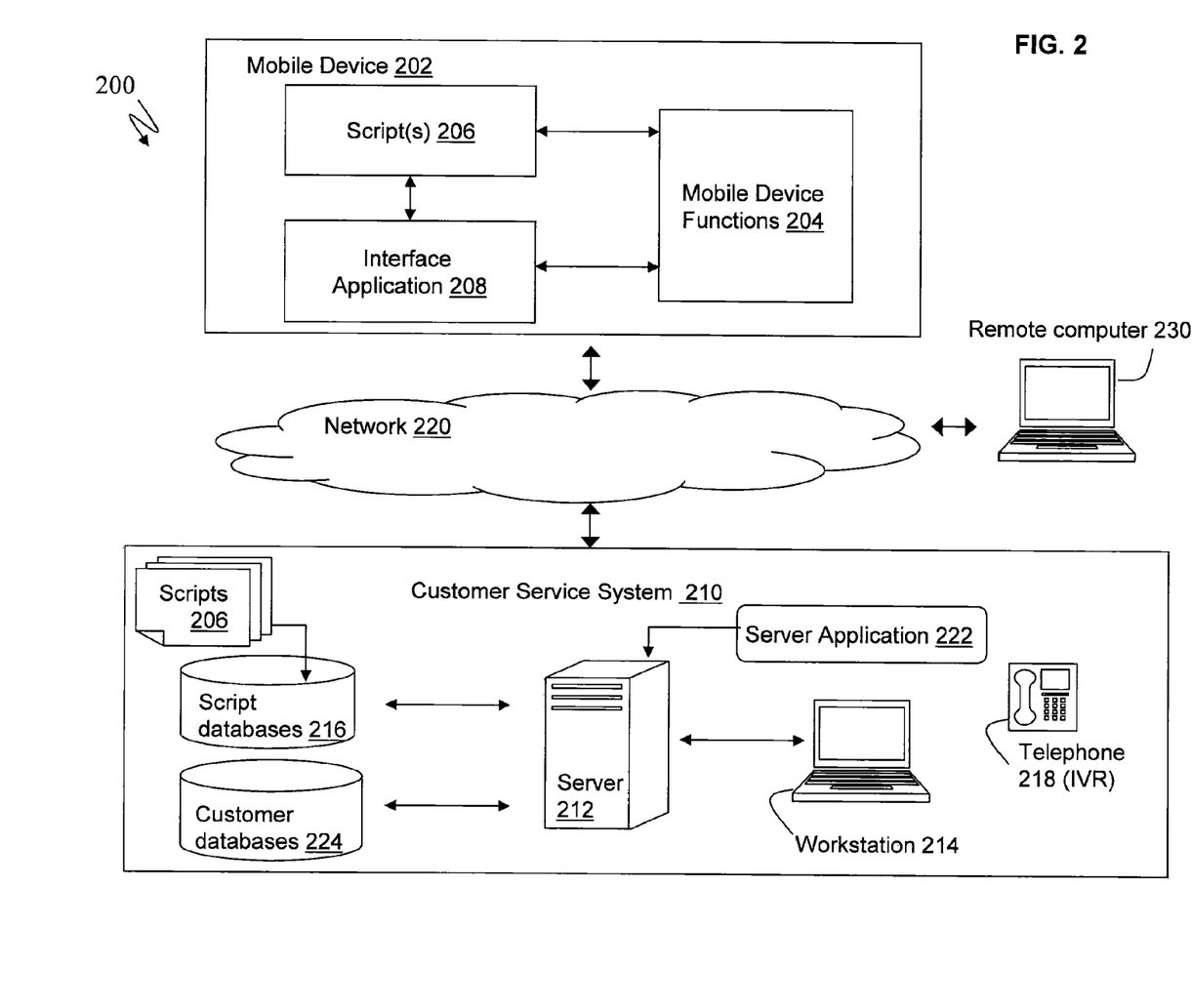
FIG. 2 illustrates a block diagram in accordance with exemplary embodiments.

FIG. 2 illustrates a block diagram 200 in accordance with exemplary embodiments. The block diagram 200 depicts a mobile device 202 operatively connected to a customer service system 210 via one or more networks 220. The customer service system 210 may include one or more servers 212, workstations 214 (e.g., a computer), script databases 216, and telephones 218. The elements of the customer service system 210 may be remotely located or located together (as shown in FIG. 2).

Additionally, the network 220 may include circuit-switched and/or packet-switched technologies and devices, such as routers, switches, hubs, gateways, etc., for facilitating communications. The network 220 may include wireline and/or wireless components utilizing, e.g., IEEE 802.11 standards for providing over-the-air transmissions of communications. The network 220 can include IP-based networks for communication between a customer service center and clients/users. The network 220 can manage multiple accounts as established by particular users. These accounts may then be used to provide access to services as described herein.

Also, the network 220 may include wireline and/or wireless components utilizing standards for, e.g., multimedia messaging services (MMS). The network 220 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 220 facilitates transmission of media (e.g., images, video, data, multimedia messaging, etc.) from content services provider systems to customers/users via devices.

In exemplary embodiments, the network 220 can include a managed IP and/or wireless network administered by a service provider, which can control bandwidth and quality of service for the communications discussed herein. The network 220 may be implemented in a wireless fashion, e.g., using wireless protocols and technologies, such as WiFi, WiMax, BLUETOOTH, etc. The network 220 can also be a packet-switched network, such as a local area network, a wide area network, a metropolitan area network, an Internet network, or other similar types of networks. The network 220 may be a cellular communications network, a fixed wireless network, a wireless local area network (LAN), a wireless wide area network (WAN), a personal area network (PAN), a virtual private network (VPN), an intranet or any other suitable network, and the network 220 may include equipment for receiving and transmitting signals, such as a cell tower, a mobile switching center, a base station, and a wireless access point.

For the sake of clarity, general elements of the mobile device 202 are not shown in the block diagram 200. For example, it is understood that the mobile device 202 includes memory (such as the memory 120), an operating system (such as the operating system 150), and processors (such as the processors 110), and other software, hardware, and firmware. The mobile device 202 also includes input/output devices (similar to the input/output devices 170) for transmitting and receiving signals and for inputting and outputting information (such as a keypad, display, USB ports, headset ports, etc.).

The various functions and options of the mobile device 202 are represented as mobile device functions 204. It is appreciated that the mobile device functions 204 is meant to capture the wide-ranging functions and options available on mobile devices and is not meant as a limitation. For example, the mobile device 202 may be an iPhone by Apple with visual voice mail. The mobile device 202 may include the various features of the iPhone which are herein incorporated by reference in the iPhone manual: iPhone User Guide For iPhone and iPhone 3G, ©2008 Apple Inc., All Rights Reserved, 019-1345/2008-09. As another example, the mobile device 202 may be an LG CU515 phone that includes video share. The LG CU515 phone and its various features are herein incorporated by reference in the LG CU515 phone manual: LG CU515 User Guide, copyright ©2007 LG Electronics, Inc. All Rights Reserved. Also, various network services for the mobile device 202, such as visual voice mail, video share, etc., may be offered by AT&T or other providers.

The user of the mobile device 202 may request assistance with one of the features of the mobile device 202. As discussed herein, the user of the mobile device 202 may desire to utilize the Bluetooth capabilities in the mobile device functions 204 of the mobile device 202. However, the user needs assistance to utilize the Bluetooth capabilities of the mobile device 202. There are many options for the user to request assistance and receive assistance as discussed herein. For example, the user may call the customer service representative on the telephone 218 and request for help setting up Bluetooth. The user can provide the customer service representative with information regarding the mobile device 202. The customer service representative may utilize a workstation 214 to determine the appropriate script(s) 206 in a script database 216 that will assist the user. The customer service representative can transmit the appropriate script 206 to the mobile device 202 to respond to the user's request for assistance.

As mentioned herein, there are many ways that information (such as mobile device type, software, model, user's name, user's telephone number, etc.) about the mobile device 202 can be received. For example, the customer service representative may input information about the mobile device 202 utilizing the workstation 214, the customer service representative may look up and extract the information from a customer database 224, and/or the user may input (e.g., speak in response to an automated prompt, or key in) information about the mobile device 202. Also, in accordance with exemplary embodiments, a server application 222 of the server 212 may be configured to extract information from the mobile device 202 itself, from a mobile switching station, from a base station, and/or from the customer database 224. Also, the customer service representative on the workstation 214 may utilize the server application 222 to obtain the information about the mobile device 202 and the user.

In response to the customer service system 210 receiving the information about the mobile device 202 (which includes the user), the customer service representative may utilize the workstation 214 to select an appropriate script, which addresses the request of the user, from the script database 216. The script database 216 contains numerous scripts. The scripts in the script database 216 can apply to various types (and brands) of mobile devices 202 and can be executed to assist with any of the features of the mobile devices 202. The scripts in the script database 216 may, e.g., include a series of translations that cause a software program and/or a hardware component to perform the functions predetermined in the script. It is understood that the applicability of the scripts in the script database 216 is not meant to be limiting.

Exemplary embodiments provide various techniques to determine and obtain the appropriate script from the script database 216 to address the user's request for assistance. In exemplary embodiments, the customer service representative may utilize a GUI to select the appropriate script(s) to address the user's request, and/or the customer service representative may request that the server application 222 (automatically) determine (and return) the appropriate script to address the user's request.

Further, in accordance with exemplary embodiments, without having to contact the customer service representative, the user may operatively connect to the server 212 to access a wireless customer service web page on the Internet using a remote computer 230 and/or using the mobile device 202 (having Internet capabilities). For example, the user may utilize the remote computer 230 (or the mobile device 202) to go to a wireless customer service website, such as www.attwireless.com hosted by the server 212, and request for assistance setting up Bluetooth. The user may input information regarding the mobile device in the wireless customer service website. In one exemplary embodiment, the user may input the mobile device information and the particular request for assistance by responding to automated promptings of, e.g., the server application 222 of the server 212, which may be equipped with interactive voice response (IVR) that allows the server application 222 to detect voice and touch tones of a phone call. The IVR system may be implemented via the server 212 and the telephone 218. Also, the user may input text in a message describing the request for assistance and mobile device information. The user can transmit the message via the mobile device 202 and/or the remote computer 230 to the server application 222 of the server 212. The user may also transmit the message to the customer service representative. In response to receiving the information about the mobile device 222 and receiving the user's request for assistance, the server application 222 (in the customer service system 210) can automatically determine the appropriate script corresponding to the input information and automatically push (transmit) the appropriate script to the mobile device 202.

Additionally, in response to receiving the information about the mobile device 202 and receiving the user's request for assistance, the customer service representative (on the workstation 214) may retrieve the appropriate script from the script database 216, and the customer service representative can transmit the appropriate script to the mobile device 202 via, e.g., an electronic mail message, peer to peer connection, multimedia messaging service, short message service, etc. Also, in exemplary embodiments, in response to the server application 222 receiving the information to obtain the appropriate script, the server application 222 can (push) transmit the appropriate script to the mobile device 202.

In the mobile device 202, scripts 206 represent one or more appropriate scripts that have been received by the mobile device 202 from the customer service system 210. The scripts 206 may have been sent by the customer service representative on the workstation 214, and/or by the server application 222 of the server 212.

The scripts 206 may be stored in the memory (e.g., the user's inbox) of the mobile device 202 and are available for (repeated) execution by the user. The user may have received the script 206 that corresponds to a particular request for assistance by the user. The user is able to view the description of the script 206, which may read, e.g., 'setting up Bluetooth capabilities'. The user may initiate the script 206, e.g., by selecting the script 206, clicking on the script 206, highlighting the script 206, etc. Also, the user may place the cursor on the script 206 and then press the enter key to execute the script. Also, in exemplary embodiments, the user may be asked do you want to execute the script 206 (e.g., an interface application 208 residing on the mobile device 202), and the user can respond in the affirmative (e.g., yes) on the mobile device 202 to execute the script 206 (e.g., the interface application 208 may execute the script 206 on the mobile device 202). Further, once a message containing the script 206 is opened or selected in the inbox, the script can automatically run on the mobile device 202.

Exemplary embodiments may provide a help menu on the mobile device 202. The help menu may be implemented by the interface application 208. The user may select the help menu of the interface application 208. The user may input a help query in the help menu of the interface application 208, and the interface application 208 causes the mobile device 202 to transmit the request to the server 212 in the customer service system 210, so that the appropriate script 206 can be pushed back to the mobile device 202 from the customer service system 210. The server application 222, e.g., may determine the appropriate script 206 based on the query and push the script 206 to the mobile device 202. In further exemplary embodiments, the help menu may have a list of help items for the user to select. The user may select a help item of the interface application 208, and the appropriate script 206 (based on the selected help item) can be pushed from the customer service system 210 to the mobile device 202.

In accordance with exemplary embodiments, the script 206 may directly interact with the mobile device functions 204 to perform the desired request of the user. For example, the user may want to utilize the zoom function on the mobile device 202 having camera capabilities. In response to being initiated/ executed, the script 206 on the mobile device 202 may be configured to cause the menu screen to be opened, the camera option of the mobile device functions 204 to be selected, and the zoom function of the mobile device functions 204 to be initiated/executed on the mobile device 202. The script 206 may also be configured with audio capabilities, such that as the script 206 navigates through the appropriate menu screens on the mobile device 202, audio can play through the speakers of the mobile device 202 so that the user can hear instructions (corresponding to the visual navigation on the display screen) to address the user's request for assistance. More is discussed below with reference to FIG. 4, which provides a pictorial representation of navigating through display screens.

Also, in exemplary embodiments, the mobile device 202 may include the interface application 208, mentioned above. The interface 208 may be configured to interface between the scripts 206 and the mobile device functions 204 of the mobile device 202. In response to executing the scripts 206, the scripts 206 may interact with the interface application 208 to assist the user with the desired request. The interface application 208 can enable the scripts 206 to run on the mobile device 202, and the interface application 208 can be configured to operate the mobile device functions 204 in accordance with the instructions of the script 206. According to exemplary embodiments, the interface application 208 may be different on various mobile devices 202. The scripts 206 can be tailored to the various interface applications 208, which ensures compatibility with the interface applications 208. Indeed, in assisting the user with features of the mobile device 202, exemplary embodiments are not limited to the interface application 208, and exemplary embodiments are capable of being implemented with or without utilizing the interface application 208.

In accordance with the various non-limiting ways of implementing exemplary embodiments, the following examples are provided. A user of the mobile device 202 may be having problems with the battery of the mobile device 202, because the battery is not working correctly. The user can request for assistance with the battery problem and receive the appropriate script 206 in many ways. The user can call on the mobile device 202 to the customer service representative on the telephone 218 and provide the information about the battery problem and mobile device 202 to the customer service representative. The customer service representative can utilize the workstation 214 to input the necessary information in the server application 222. The user and/or the server application 222 can determine the appropriate script 206 in the script databases 216 that corresponds to the user's battery problem and that corresponds to the mobile device 202. The customer service representative can transmit the script 206 to the mobile device 202 of the user. The user can open the script 206 in the user's inbox, and the script 206 can run on the mobile device 202 to fix the battery problem.

In another example, a user of the mobile device 202 may desire to change the ringer from ring to vibrate on the mobile device 202. The user may utilize the remote computer 230 to access a website hosted on the server 212 to request for assistance changing the ringer from ring to vibrate. The use can input the request for assistance and information about the mobile device 202 in the server application 222 of the server 212. The server application 222 can determine the appropriate script 206 in the script databases 216 that corresponds to the user's ringer request and that corresponds to the specific mobile device 202. The server application 222 can push the appropriate script 206 to the mobile device 202. The user may open the inbox and select the script 206 to run on the mobile device 202 to change the ringer from ring to vibrate.

In yet another example, a user of the mobile device 202 may desire to access the camera when there is no short key on the mobile device 202. The user may open the help menu of the interface application 208, and the user can scroll through topics in the help menu to request for assistance by selecting the topic for accessing the camera. In an alternate embodiment, the user may input a query requesting help to access the camera in the help menu. Once the user inputs the query or selects the topic, the interface application 208 can automatically transmit the request for assistance and the type of mobile device 202 to the server 212. The server application 222 can receive the information and determine the appropriate script 206 based on the request for assistance and the specific mobile device 202. After retrieving the script 206 from the script database 216, the server application 222 can push the script 206 to the mobile device 202. The interface application 208 can retrieve the script 206 from the inbox of the mobile device 202 and cause the script 206 to run on the mobile device 202 to change the ringer from ring to vibrate.

In an example, a user of the mobile device 202 may desire to access the web from the mobile device 202. The user may call to the IVR system implemented via the server 212 and the telephone 218. The user may speak (or key in) information for the request for assistance with accessing the web, in response to automated promptings of the IVR system. Also, the user may speak the information about the specific mobile device 202. Once the IVR system has received all the information, the server application 222 can determine the appropriate script 206 in the script database 216 based on the request for assistance and the type of mobile device 202. The server application 222 can push the script 206 to the mobile device 202. The user can select the script 206 in the mobile device 202, so that the script 206 can run on the mobile device 202 to access the web (e.g., Internet) for the user.

These are merely examples and many others are anticipated which are now known or later discovered.

Figure 3:
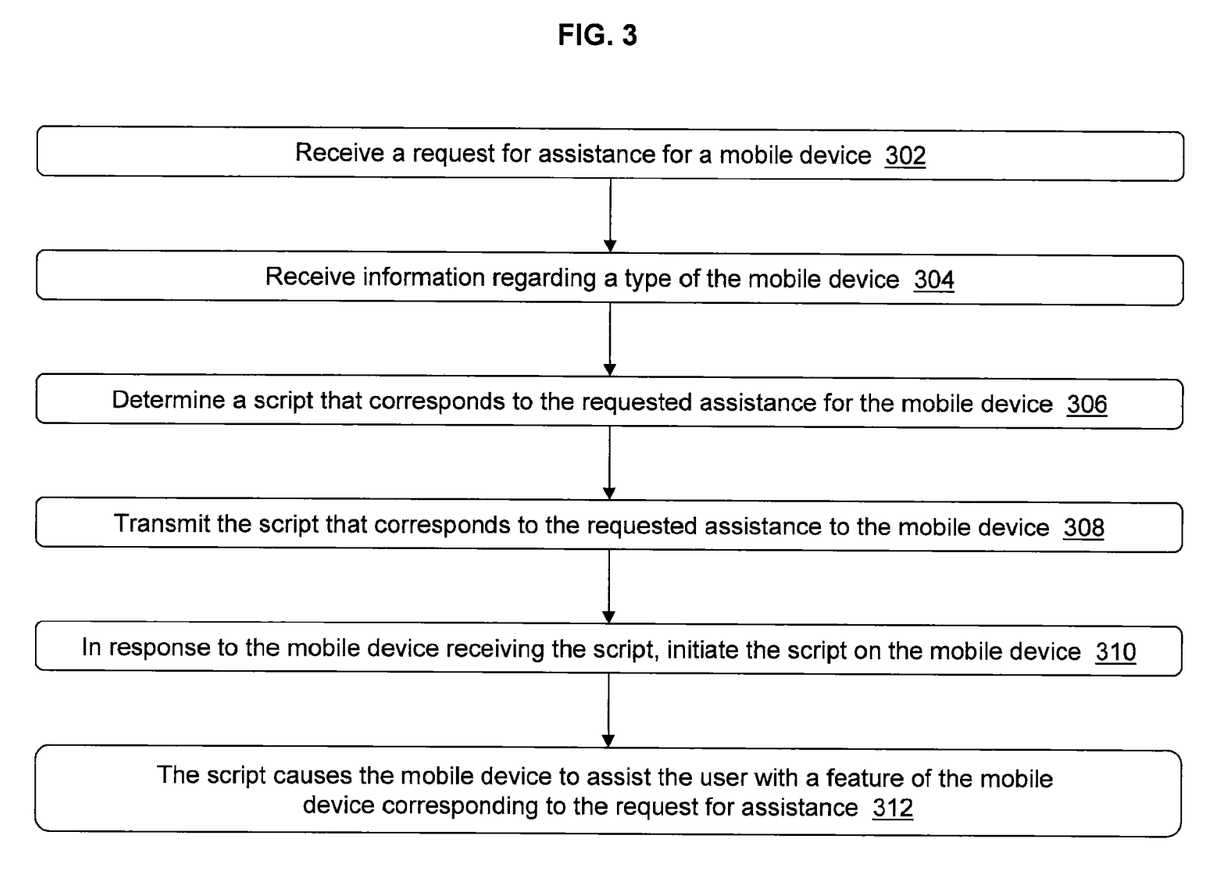
FIG. 3 illustrates a method for wireless customer service in accordance with exemplary embodiments.

Now turning to FIG. 3, FIG. 3 illustrates a method for wireless customer service in accordance with exemplary embodiments. A request for assistance is received from a user for a mobile device at 302.

Information is received regarding a type of the mobile device at 304. The information may be input by the user, the customer service representative, and/or extracted from the mobile device 202 or the customer database 224.

A script that corresponds to the requested assistance for the mobile device is determined at 306. The server application 222, the customer service representative, or the user may determine the script that is suitable to assist the user.

The script that corresponds to the requested assistance is transmitted to the mobile device at 308.

In response to the mobile device receiving the script, the script is initiated/executed on the mobile device at 310. The interface application 208, and/or the user may initiate the script on the mobile device 202. The script can be automatically run in response to a single selection, e.g., of the script in the inbox. Also, in exemplary embodiments, the script may be run in response to prompts.

The script causes the mobile device to assist the user with a feature of the mobile device corresponding to the request for assistance at 312. The script can assist the user with any features, e.g., of the mobile devices functions 204, so that the user can fully utilize functions and options of the mobile device 202.

Determining a script that corresponds to the requested assistance for the mobile device may comprise a customer service representative selecting the script based on the received information regarding the type of the mobile device and based on the feature in which assistance is requested. Also, determining a script that corresponds to the requested assistance for the mobile device may comprise a wireless customer service system automatically determining the script to select based on the received information regarding the type of the mobile device and based on the feature in which assistance is requested. Furthermore, determining the script may comprise a wireless customer selecting a compatible script via the remote computer 230 or by using the mobile device 202.

Transmitting the script to the mobile device may comprise transmitting the script via a peer-to-peer connection, an electronic mail message, a multimedia messaging service, and/or a short message service.

The script can be initiated/executed on the mobile device by highlighting the script and pressing an enter key, clicking on the script, and/or providing an affirmative response to a query to execute the script. The script is preconfigured to address the request for assistance for the mobile device. The script is selected from a plurality of scripts, where each script is preconfigured to respectively assist with various features for various (types of) mobile devices.

Figure 4:
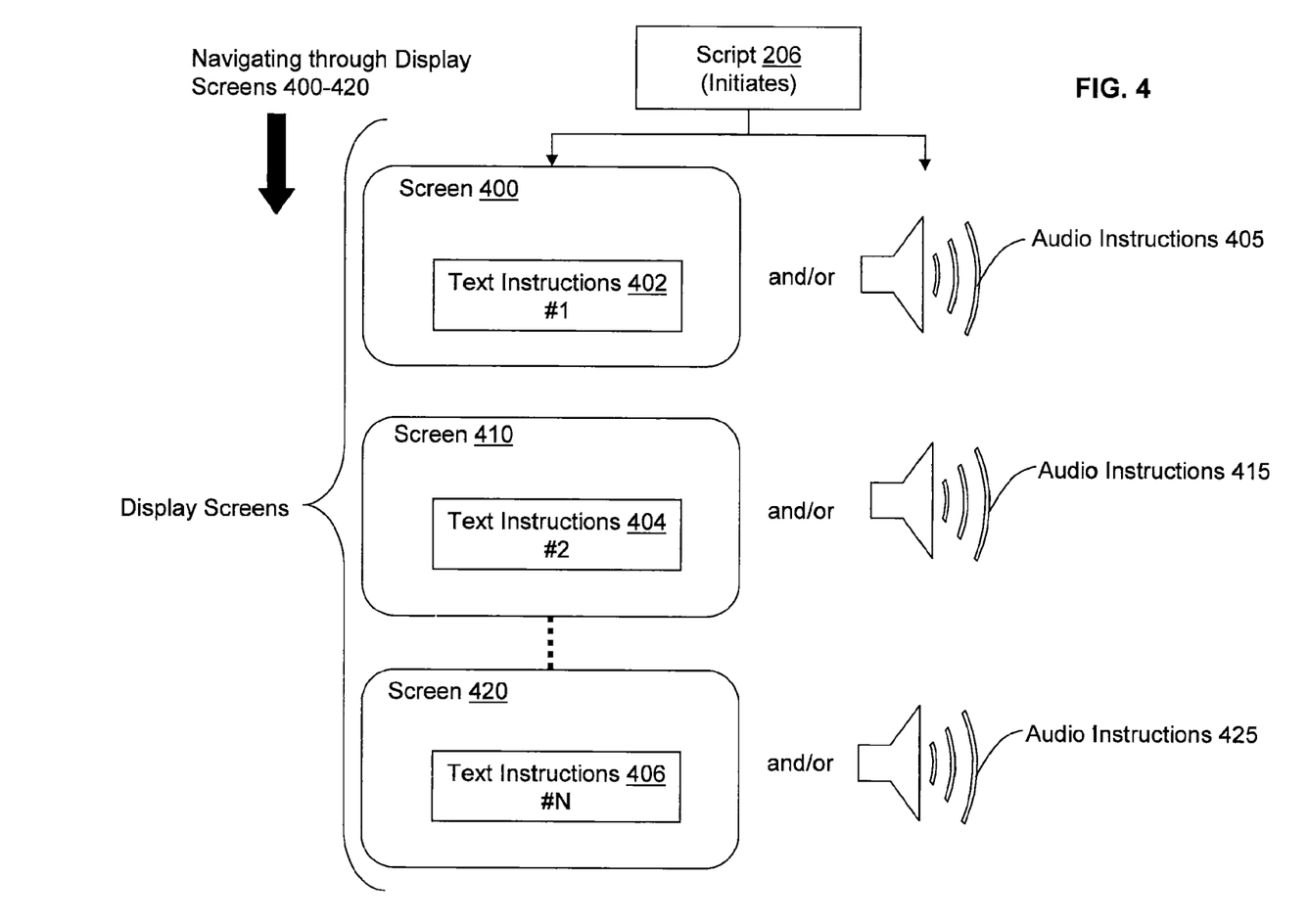
FIG. 4 provides a pictorial representation of how scripts may assist a user of a mobile device in accordance with exemplary embodiments.

FIG. 4 provides a pictorial representation of how the scripts 206 may navigate through display screens to assist a user on the mobile device 202 in accordance with exemplary embodiments.

The script 206 can be configured to cause the mobile device 202 to navigate through a plurality of display screens 400, 410, and 420 (in which display 420 represents the Nth screen) on the mobile device 202 to help the user with features of the mobile device 202. In accordance with exemplary embodiments, the script 206 may interact with the interface application 208 to navigate through the display screens 400-420 and/or the script 206 may navigate through the display screens without having to interact with the interface application 208.

As an example, the script 206 may be initiated/executed to assist a user on the mobile device 202. The script 206 may cause (or navigate to) the screen 400 such that the screen 400 is displayed on the mobile device 202 for the user. The screen 400 may be, e.g., a menu screen that shows various items for selection or allows data to be input. The script 206 can automatically select the item (on the menu screen, in the background, etc.) that corresponds with the user's request for assistance and/or automatically input any necessary data. Next, the script 206 may navigate to screen 410 for the user. The screen 410 may have the option of selecting items for a particular feature desired by the user. The script 206 can cause the correct item on the screen 410 to be selected or cause the correct information to be input.

Further, for the desired feature to be completed, the script 206 may navigate to the Nth screen which is represented as the screen 420. The script 206 can cause the appropriate item on the screen 420 to be selected or cause the appropriate data to be input. As a result, the script 206 has helped the user with the request feature on the mobile device 202.

Also, in exemplary embodiments, the user may be asked to perform certain tasks in conjunction with script 206. As such, the script 206 may be configured to provide text instructions 402, 404, 406 (where text instructions 406 is the Nth instruction) to instruct the user, and provide audio instructions 405, 415, and 425 (where audio instructions 425 is the Nth instructions) to audibly instruct the user. As an example, the script 206 may be initiated/executed to assist a user on the mobile device 202. The script 206 may cause the screen 400 to be displayed for the user, and as mentioned above, the screen 400 may be a menu screen that shows various items for selection or allows data to be input. In this case, the script 206 can cause text instructions 402 to be displayed on the screen 400, such that the user can follow the instructions to select the appropriate item on the screen 400 or input data. Similarly, the script 206 can also provide audio instructions 405 to audibly instruct the user to select the appropriate item. It is understood that throughout this example, the script 206 can automatically select the item and/or automatically input the data.

Next, in response to the user following the instructions, the mobile device 202 navigates to screen 410 for the user. As mentioned above, the screen 410 may have the option of selecting items for a particular feature desired by the user. In this case, the script 206 can cause text instructions 404 to be displayed so that the user can read the instructions and make the necessary selection (or input data). Similarly, the script 206 can cause audio instructions 415 to audibly instruct the user to make the selection (or input information).

Further, in response to the user following the instructions, the mobile device 202 navigates to the screen 420 (the Nth screen). The script 206 can cause text instructions 406 to be displayed so that the user can read the instructions and make the necessary selection (or input data). Similarly, the script 206 can cause audio instructions 425 to audibly instruct the user to make a selection (or input information). After the user follows the instructions, the user's request has been fulfilled and the desired feature has been properly enabled.

FIG. 4 is provided for explanatory purposes only and is not meant to be limiting. Indeed it is understood that exemplary embodiments may be implemented without navigating through the display screens as illustrated in FIG. 4. When assisting the user with features of the mobile device 202, it can be appreciated that there can be shared responsibilities among the script 206, the interface application 208, and/or the user of the mobile device 202. For example, when navigating through the display screens 400-420, some of the responsibility may be on the user (to select an item, input data, connect an ear piece, press a key, connect a USB cord, remove an attachment, etc.) to move to the next display screen (or set of instructions), and/or some of the responsibility may be on the script 206 (or the interface 208) to move to the next screen (or set of instructions). To assist with certain features of the mobile device 202, it can therefore be appreciated that some operations may be completely automated not requiring any action from the user, while other operations may be a cooperation between the user and the script 206 (or the interface application 208). Further, some actions may require the user to follow instructions provided by the script 206 such that the features of the mobile device 202 can be activated.

In an example, a user may have requested assistance from the customer service system 210 to pair a Bluetooth headset with the mobile device 202. The user may receive the script 206 on the mobile device 202 for pairing the Bluetooth headset with the mobile device 202. In response to the script 206 being executed on the mobile device 202, the script 206 can automatically turn on the Bluetooth function in the mobile device 202. This may be accomplished by running in the background on the mobile device 202, or the script 206 can go to the display screen 400 and select an item to activate the Bluetooth function. Next, the script 206 can automatically place the Bluetooth headset in pairing mode. Optionally, the script 206 can provide text instructions 402 and/or audio instructions 405 requesting the user to press the power button for five seconds (e.g., until a light flashes) on the Bluetooth headset to put the Bluetooth headset in pairing mode. Next, the script 206 running in the background can automatically cause the mobile device 202 to search for the Bluetooth headset. Optionally, the script 206 may select the option "look for devices" on the display screen 410, or the script 206 may provide text instructions 404 and/or audio instructions 415 requesting the user to select "look for devices" on the display screen 410. Finally, once the mobile device 202 finds the Bluetooth headset, the script 206 can automatically select the Bluetooth headset from a list and input the pin code (e.g., 0000) corresponding the to the Bluetooth headset. It is understood that all the necessary information for enabling Bluetooth can be obtained in advance when the user requests for assistance. Now, continuing the example, the script 206 may provide text instructions 406 and/or audio instructions 425 requesting the user to select the Bluetooth headset from a list on the display screen 420 and requesting the user to input the pin code (e.g., 0000) corresponding the to the Bluetooth headset. Now the Bluetooth headset has been properly paired to the mobile device 202. During the whole process of enabling, it can be seen that the script 206 can be configured to require more, less, or no help from user in accordance with exemplary embodiments.

Additionally, in exemplary embodiments, the script 206 (from the script database 216) may be configured to implement various modes. The script 206 may have a "teaching mode" which provides, e.g., audio explanation and moving arrows to help the user understand how to change/modify the requested feature. The teaching mode may operate in conjunction with the interface application 208. Also, the script 206 may have another mode, which simply changes/modifies the feature, because the user just wants the feature fixed but does not want to learn to fix it himself.

In accordance with exemplary embodiments, the script 206 can be configured with the ability to be auto run (e.g., the user does not have to double click an icon, but the script 206 runs when the SMS is opened).

The script 206 may be mobile device specific and/or may be configured to sense the mobile device 202. As such, a user can be prevented from transmitting the script 206 to a friend, which may potentially cause errors on the friend's phone. Further, the script 206 may be configured to have the ability to check the mobile device 202 to ensure, e.g., that this is the correct model, has proper memory, has the correct operating system, etc. Also, the script 206 may check whether there are any conflicting features set on the mobile device 202 (e.g., the user has requested assistance to turn the speaker phone "ON", but the user has the volume set to off).

Accordingly, since the scripts 206 may be mobile device specific, exemplary embodiments can provide different scripts 206 for different types of mobile devices 202. One of ordinary skill in the art understands that the script 206 can be configured to operate with various hardware components and with various operating systems. For example, the script 206 may be configured to operate with the following operating systems, and others: Symbian OS from Symbian Ltd., RIM BlackBerry operating system, Windows Mobile from Microsoft, Linux operating system, iPhone OS from Apple Inc., Palm OS developed by PalmSource, and Binary Runtime Environment for Wireless (BREW).

It is understood that the scripts 206 may be configured in various ways. The scripts 206 may be implemented as a hotlink (also known as inline linking), which may use a linked object from one site into a webpage belonging to a second site. The hotlink may link to the appropriate script 206 to be run on the mobile device 202.

Figure 5:
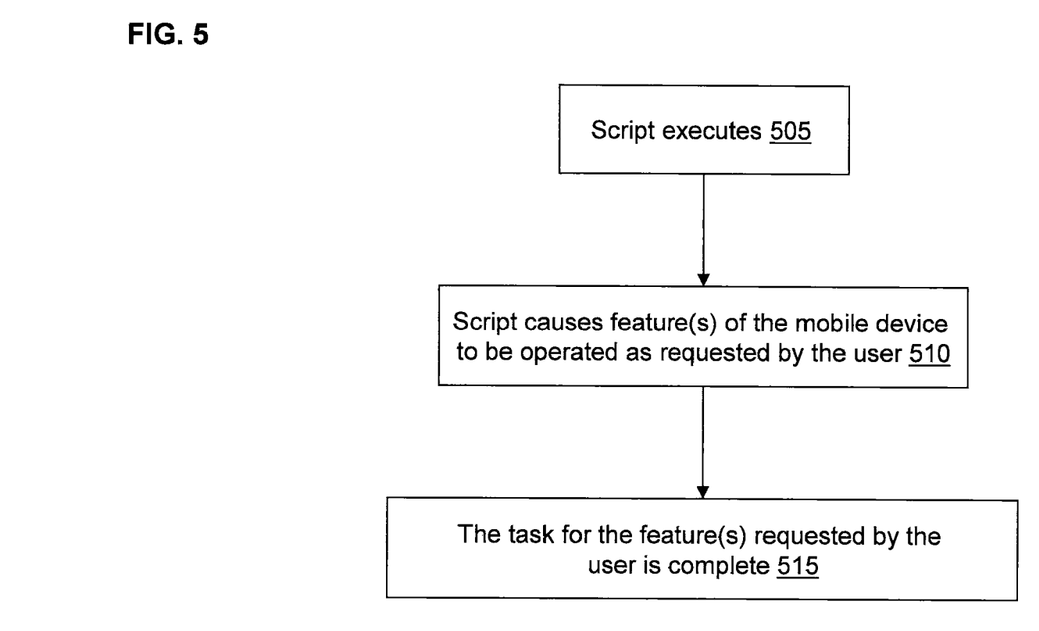
FIG. 5 illustrates an example in which scripts may automatically run on a mobile device in accordance with exemplary embodiments.

FIG. 5 illustrates an example in which the script 206 may automatically run on the mobile device 202 in accordance with exemplary embodiments. The user may have received the script 206 corresponding to the requested from the customer service system 201, and the script 206 may be in the inbox of the mobile device 202. The user may select the script 206 in the inbox and the script 206 is initiated/executed at 505. Once the script 206 is initiated/executed, the script causes the requested feature of the mobile device 202 to be operated as requested by the user at 510. Once the script 206 has followed its instructions to fix the feature as requested by the user, the script 206 is complete at 515. These operations may take place on the mobile device 202 without displaying the screens 400-420.

As described above, the exemplary embodiments can be in the form of computer-implemented processes and apparatus for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for wireless customer service, the method comprising:
   receiving, at a processor, a request for assistance for a mobile device and information regarding a model of the mobile device;
   determining, by the processor, a script that applies to the request for assistance for the mobile device and to the model of the mobile device, the script for causing the mobile device to assist a user with a feature of the mobile device corresponding to the request for assistance; and
   transmitting, by the processor via a network, the script that applies to the request for assistance and to the model of the mobile device to the mobile device, wherein the script is configured to check the mobile device to determine whether the information received regarding the model of the mobile device is correct, wherein the script is further configured to check the mobile device for a mobile device feature that conflicts with assistance provided by the script regarding the feature of the mobile device corresponding to the request for assistance, and wherein the script is further configured to prevent transmission of the script from the mobile device to another mobile device.

2. The method of claim 1, wherein the information regarding the model of the mobile device is input by the user.

3. The method of claim 1, wherein the information regarding the model of the mobile device is extracted from the mobile device.

4. The method of claim 1, wherein transmitting the script to the mobile device comprises transmitting the script via peer-to-peer connection.

5. The method of claim 1, wherein the script is further configured to check the mobile device to determine whether the mobile device has sufficient memory for the script.

6. The method of claim 1, wherein the script is configured to address the request for assistance for the mobile device, and wherein the script can be initiated a plurality of times to assist the user.

7. The method of claim 1, wherein determining the script that applies to the request for assistance for the mobile device and to the model of the mobile device comprises selecting the script from a plurality of scripts based on the request for assistance for the mobile device and the model of the mobile device, each of the plurality of scripts configured to assist with a feature of a type of mobile device.

8. The method of claim 1, wherein the script comprises an option allowing the user of the mobile device to assign the script to a softkey associated with the mobile device.

9. A non-transitory computer readable medium for providing wireless customer services, the non-transitory computer readable medium storing instructions that, when executed by a processor, cause the processor to perform operations comprising:
receiving a request for assistance for a mobile device and information regarding a model of the mobile device;
determining a script that applies to the request for assistance for the mobile device and to the model of the mobile device, the script for causing the mobile device to assist the user with a feature of the mobile device corresponding to the request for assistance; and
transmitting, via a network, the script that applies to the request for assistance and to the model of the mobile device to the mobile device, wherein the script is configured to check the mobile device to determine whether the information received regarding the model of the mobile device is correct, wherein the script is further configured to check the mobile device for a mobile device feature that conflicts with assistance provided by the script regarding the feature of the mobile device corresponding to the request for assistance, and wherein the script is further configured to prevent transmission of the script from the mobile device to another mobile device.

10. The non-transitory computer readable medium of claim 9, wherein the information regarding the model of the mobile device is extracted from a customer database.

11. The non-transitory computer readable medium of claim 9, wherein transmitting the script to the mobile device comprises transmitting the script via a peer-to-peer connection.

12. The non-transitory computer readable medium of claim 9, wherein the script is further configured to check the mobile device to determine whether the mobile device has sufficient memory for the script.

13. The non-transitory computer readable medium of claim 9, wherein determining that the script applies to the request for assistance for the mobile device and to the model of the mobile device comprises selecting the script from a plurality of scripts, each of the plurality of scripts configured to assist with a feature of a type of mobile device.

14. A wireless customer service server for providing wireless customer service, the wireless customer service server comprising:
memory for storing a program for providing the wireless customer service; and
a processor being responsive to computer-executable instructions contained in the program that, when executed by the processor, cause the processor to perform operations comprising:
receiving a request for assistance for a mobile device,
receiving information regarding a model of the mobile device,
determining a script that applies to the request for assistance for the mobile device and to the model of the mobile device, the script for causing the mobile device to assist a user with a feature of the mobile device corresponding to the request for assistance, and
transmitting, via a network, the script that applies to the request for assistance and to the model of the mobile device to the mobile device, wherein the script is configured to check the mobile device to determine whether the information received regarding the model of the mobile device is correct, wherein the script is further configured to check the mobile device for a mobile device feature that conflicts with assistance provided by the script regarding the feature of the mobile device corresponding to the request for assistance, and wherein the script is further configured to prevent transmission of the script from the mobile device to another mobile device.

15. The wireless customer service server of claim 14, wherein the information regarding the model of the mobile device is input by the user.

16. The wireless customer service server of claim 14, wherein the script is further configured to check the mobile device to determine whether the mobile device has sufficient memory for the script.

17. The wireless customer service server of claim 14, wherein determining the script that applies to the request for assistance for the mobile device and to the model of the mobile device comprises selecting the script from a plurality of scripts, each of the plurality of scripts being configured to assist with a feature of a type of a mobile device.

* * * * *